United States Patent [19]

Minakata et al.

[11] Patent Number: 4,866,406
[45] Date of Patent: Sep. 12, 1989

[54] WIDE-BAND OPTICAL MODULATOR

[75] Inventors: Makoto Minakata; Kazunori Miura, both of Sendai, Japan

[73] Assignee: Sumitomo Special Metal Co., Ltd., Osaka, Japan

[21] Appl. No.: 85,722

[22] Filed: Aug. 17, 1987

[30] Foreign Application Priority Data

Aug. 20, 1986 [JP] Japan .................................. 61-194720

[51] Int. Cl.⁴ ............................................. G02F 1/03
[52] U.S. Cl. .................................. 330/4.3; 350/96.13; 350/96.14
[58] Field of Search .................... 332/7.51; 350/96.13, 350/96.14

[56] References Cited

U.S. PATENT DOCUMENTS

| | | | |
|---|---|---|---|
| 3,695,745 | 10/1972 | Furukawa | 350/96.14 |
| 3,990,775 | 11/1976 | Kaminow et al. | 350/96.14 |
| 4,048,591 | 9/1977 | Auracher | 332/7.51 |
| 4,111,523 | 9/1978 | Kaminow et al. | 350/96.14 |
| 4,166,669 | 9/1979 | Leonberger et al. | 350/96.14 |
| 4,268,116 | 5/1981 | Schmadel et al. | 332/7.51 |
| 4,683,448 | 7/1987 | Duchet et al. | 332/7.51 |

FOREIGN PATENT DOCUMENTS

| | | | |
|---|---|---|---|
| 0051955 | 4/1977 | Japan | 350/96.14 |
| 0060622 | 4/1985 | Japan | 350/96.14 |

Primary Examiner—Thomas H. Tarcza
Assistant Examiner—Mark Hellner
Attorney, Agent, or Firm—Watson, Cole, Grindle & Watson

[57] ABSTRACT

The present invention provides a wide band optical modulator comprising an optical waveguide which is provided on a substrate and comprises a substance having electrooptic effects, a laminate which is provided on the optical waveguide and comprises a substance having a refractive index smaller than that of the optical waveguide, and two traveling-wave electrodes which are provided opposite to each other on the parallel side surfaces of the laminate in the traveling direction of light so as to hold the laminate therebetween. When the laminate provided on the optical waveguide is replaced by a gap, similar effects to those of the above-described optical modulator can be obtained.

20 Claims, 12 Drawing Sheets

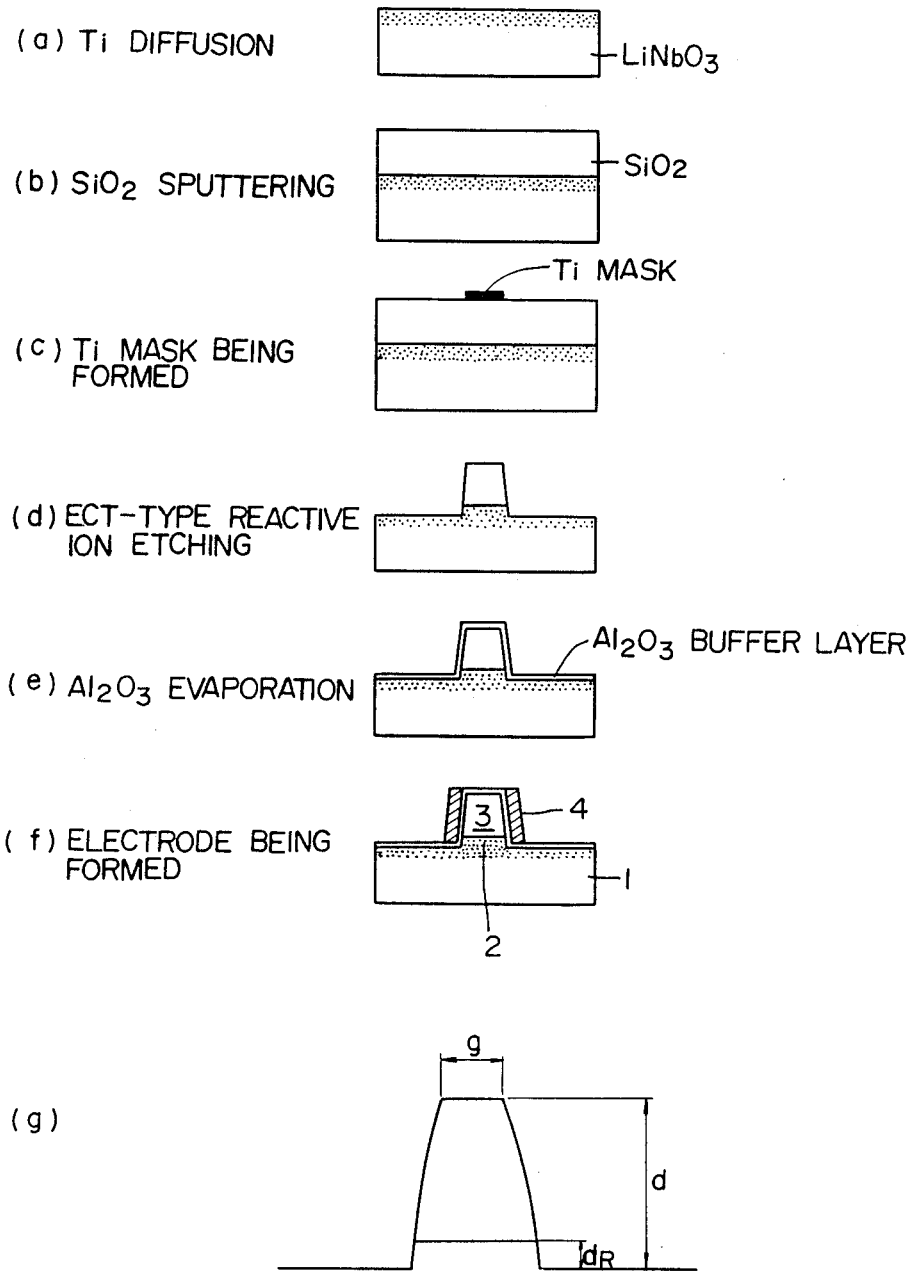

SPECTRA OF MODULATION

WIDE-BAND OPTICAL MODULATOR

BACKGROUND OF THE INVENTION

1. Field of the Invention

The present invention relates to an optical modulator which is made of substances having electro-optic effects and comprises a guide structure having an optical waveguide between two opposite traveling-wave type electrodes, and particularly to a wide-band optical modulator which exhibits a wide band, a small driving voltage, and high modulation efficiency and which is capable of obtaining complete matching of the phase velocity of an optical wave with that of a modulating wave.

2. Description of the Related Art

An optical modulator is an element used for causing the strength and the phase of an optical wave to be changed in accordance with signals and is one of the most fundamental active devices in optical communication and optical information processing.

Since an optical modulator and an optical switch are required to function in a wide band, at a super-high speed, and with a lower driving power, a wave guide-type element has been developed which employs electro-optic effects fundamentally showing a high operating speed and which can obtain a characteristic of high efficiency.

In addition, it has been thought that a configuration employing traveling-wave type electrodes is excellent for making a wide band optical modulator or optical switch or for achieving very high speed, and various kinds of such configuration have been proposed, as described below.

In general, with respect to an optical modulator having traveling-wave type electrodes in which an optical waveguide is made of a substance having electro-optic effects, the following equations apply.

If the refractive index of the wave guide for an optical wave is $n_o$ and the equivalent refractive index of the substance having electro-optic effects for a modulated wave is $n_m$, the phase velocities $V_o$, $V_m$ of the optical wave and the modulating wave are expressed by the following equation (1):

$$V_o = C_o/n_o, \quad V_m = C_o/n_m \tag{1}$$

wherein $C_o$ is the velocity of light in vacuum.

If the bandwidth of "3dB down" modulation by means of the traveling-wave operation is fm and the length of the electrodes is, the equation (2) is established.

$$fm \cdot = \frac{2 C_o}{\pi} \cdot \frac{1}{|n_m - n_o|} \tag{2}$$

Namely, it can be seen that the upper bound of the modulation bandwidth or the high-speed modulation frequency is limited by the difference between $n_m$ and $n_o$.

The $n_o$ value is the value of refractive index of the optical waveguide, while if the capacitance per unit length of the electrodes is C, the equivalent refractive index $n_m$ for the modulating wave is expressed by the following equation (3):

$$n_m = (C/C_o)^{\frac{1}{2}} \tag{3}$$

wherein $C_o$ is the capacitance per unit length when the substance having electro-optic effects is replaced in vacuum.

In addition, the driving power P necessary for 100% modulation is expressed by the following equation (4):

$$P = V_\pi^2/Z_o \tag{4}$$

wherein $V_\pi$, $Z_o$ are the half-wave voltage and the characteristic impedance of the electrodes and are expressed by the equations (5) and (6), respectively:

$$V_\pi = \lambda_o g/n_o^3 \cdot r\Gamma \cdot \beta \tag{5}$$

$$Z_o = 1/C_o \cdot n_m \cdot C_o \tag{6}$$

wherein $\lambda_o$ is a free space optical wavelength; g, the distance between electrodes; r, an electro-optic constant; and $\Gamma$, a superimposed integral coefficient of the modulation electric field and the strength of the guided optical wave which depends upon the shapes of electrodes and thus is called a field correction factor within the range of $0 < \Gamma \leq 1$.

The characteristics of conventional optical modulators are described in detail below on the basis of the above-described equations (1) to (6).

An optical modulator shown in FIG. 11 is one which is conventionally most widely used and which comprises an optical waveguide (11) provided in the vicinity of the surface of a $LiNbO_3$ crystal substrate (10) in a given direction, planar type traveling-wave electrodes (12) having asymmetrical forms and adhered to the surface of the substrate (10) so as to hold the optical waveguide (11) therebetween, a power source for modulation (13) connected to one end of each traveling-wave electrode (12), and a resistance (14) provided at the terminal of each traveling-wave electrode (12).

The modulating wave supplied from the modulation power source (13) progresses on the traveling-wave electrodes (12) at a phase velocity $V_m$ and is consumed as heat by the resistance (14) so that it is not returned to the power source side (3).

A ray of incident light (15) progresses in the optical waveguide (11) at a phase velocity $V_o$ and is subjected to modulation by the traveling-wave modulation field.

In order to obtain high efficiency, the refractive index for extraordinary rays is often used in the optical waveguide comprising the $LiNbO_3$ crystal substrate, and thus $n_o = 2.20$.

If the dielectric constants of $LiNbO_3 \epsilon_1 = 43$, $\epsilon_3 = 28$ are used, the following equation is obtained from the equation (3)

$$n_m = (C/C_o)^{\frac{1}{2}}$$
$$= (\Sigma_E)^{\frac{1}{2}} \simeq \{(1 + \sqrt{\Sigma_1 \cdot \Sigma_3})/2\}^{\frac{1}{2}} = 4.2$$

wherein $\epsilon_E$ is called an effective dielectric constant. From the calculations made by an exact successive over-relaxation method, $$n_m \simeq 4.28$$

Therefore, when $n_o = 2.20$ and $n_m = 4.20$ are substituted into the equations (1) and (2), $$V_o/V_m = 1.95$$

$$f_m \cdot l \approx 9.2 \text{ GHz·cm}$$

are obtained.

In other words, it is found that the optical modulator shown in FIG. 11 shows a disadvantage in that, when the length of each electrode l=1 cm, bandwidths above 9.2 GHz or high speed modulation at above 9.2 GHz cannot be obtained because the velocity of the optical wave is 1.95 times that of the modulating wave.

In addition, if the width of the widest electrode of the traveling-wave electrodes (12) is semi-infinite, the width of the narrow electrode is W, and the distance between the electrodes is g, when W/g≈1.5, $Z_o$=50Ω and matching of the feeding system is thus obtained.

However, if the W/g value is changed, the fm value is not changed because of the constant value of $n_m$≈4.2.

In addition, planar type traveling-wave electrodes generally show disadvantages with respect to having a small value of Γ, which may be as small as <0.4, a large value of $V_\pi$, and low modulation efficiency.

Furthermore, there is an important problem in creating a band limit with respect to an absorption loss of the modulating wave by the electrode resistance. Thus, the thickness of the electrodes is required to be a skin depth (about 3 μm in Al or Au electrodes) or more.

It is found from the equation (5) that g is required to be reduced in order to reduce $V_\pi$, but, since $Z_o$=50Ω, there is a limit of W/g=1.5 and the width of the electrode is thus extremely small, leading to an increase in resistance.

Since Γ is reduced as g is reduced and, owing to manufacturing limits, the thickness of the electrode is required to be reduced as g is reduced, the above-described planar-type electrodes show disadvantages in that the modulation bandwidth is reduced as efficiency is improved.

The optical modulator shown in FIG. 12 has a similar configuration to that of the optical modulator shown in FIG. 11, in which, since the phases of traveling-wave electrodes (16) are periodically reversed, an optical waveguide (11) lies in a periodical zig-zag and the sign of an electrical field applied to the optical waveguide (11) is reversed.

In this optical modulator, when the modulation frequency is sufficiently low, the sign of the phase to be modulated is changed in each period and light is slightly modulated.

On the other hand, when the frequency is increased and a wavelength becomes the period of the electrodes, the periodic portion of the negative (or positive) electrical field is reversed by the turn of the electrodes and thus only a positive (or negative) electrical field is constantly applied to light, without any deterioration of the modulation efficiency.

In addition, when a frequency is further increased, the wavelength in the modulation field is decreased and deviates from the turning period of the electrodes, again leading to deterioration of the modulation efficiency.

Therefore, it is fundamentally difficult to obtain a wide band characteristic in the configuration shown in FIG. 12. The shape of the electrodes reduces the width of the effective modulation region and increases the resistance of the electrodes, and the planar shape reduces the Γ value and thus decreases efficiency. There are certain problems in that the characteristic impedance $Z_o$ shows a change and in that the forming of the electrodes requires many process steps and is difficult to perform.

The optical modulator shown in FIG. 13 has a branched interference-type configuration in which a groove portion (18) is provided between the branched portions of an optical guide (17) which branches into two guides in the middle of the guide on a substrate (10), and in which a light output is subjected to strength modulation. Traveling-wave electrodes (12) have asymmetrical shapes and the modulation characteristic is determined by the phase modulation characteristic.

In such a configuration, the groove portion (18) provided therein causes components in an electrical field to leak into the air and reduces the equivalent refractive index $n_m$ of a modulating wave.

Even if the shape of the groove portion (18) is changed into various forms, there is a limit on $n_m$. For example, when a groove having a width of 6 μm and a depth of 6 μm is provided on a $LiNbO_3$ substrate, $n_m$ is reduced to about 3.8 and by the equation (2), $$f_m l \approx 12 \text{ GHz·cm,}$$

with the bandwidth being increased by about 30% as compared with a case in which no groove is provided.

However, as described above, since the field components leak to the groove portion, the Γ value is reduced further, decreases even more as the band is made wider, and becomes as small as <0.35, as compared with the case of a planar-type electrode without any groove.

The optical modulator shown in FIG. 14 is provided with a $LiTaO_3$ crystal C-plate substrate and traveling-wave electrodes (22) having reverse L-shaped sections, in which two $SiO_2$ plates (21) are disposed on the substrate (20) so as to hold an optical guide (11) therebetween, the traveling-wave electrodes (22) having reverse L-shaped sections being provided on the upper surfaces and the opposite surfaces thereof. The characteristic impedance $Z_o$ and the equivalent refractive index $n_m$ can be changed by changing the width L and the height H of each electrode to various values.

If the width of the electrodes is increased, $n_m$ becomes maximum and is then gradually decreased.

On the other hand, since $Z_o$ is slowly reduced, matching is obtained at $Z_o$=50Ω at a suitable value of L. At this time, the greater the H value becomes, the greater is the L value.

In addition, if L is reduced, $n_m$ is reduced as H increases, but conversely, $Z_o$ is rapidly increased, and no matching is thus obtained in a 50Ω system. It is seen from this that there is a lower limit on $n_m$.

Therefore, as an appropriate example of design, when H=5 μm, L=200 μm, g=50 μm, $Z_o$=50Ω, $n_m$=3.5 and from the equation (2), $$f_m \cdot l \doteq 14.7 \text{ GHz·cm.}$$

The bandwidth of the optical modulator shown in FIG. 14 is thus about 1.6 times that of the optical modulator shown in FIG. 11.

In such a configuration, however, it is difficult to cause the velocity of the optical wave to be matched with that of the modulated wave and simultaneous matching of the characteristic impedance is very difficult.

In addition, since the components of the modulation field leak into the $SiO_2$ plates (21) and the air layer which are close to the electrodes (22), $n_m$ is reduced, but there is a weak relation to the optical waveguide (11) and the Γ value is thus substantially the same as that of the above-described planar-type electrodes.

There is also a disadvantage in that the distance between the electrodes is limited by the matching of impedance and it is thus difficult to reduce the distance, resulting in an increased $V_\pi$ value.

The optical modulator shown in FIG. 15 comprising a so-called ridge-type optical waveguide is characterized in that an optical guide (23) of a convex strip shape is provided on a substrate (10), and an optical waveguide (23) having a rectangular section makes the ratio of confinement of light energy good, enables its size to be made small without any limit on diffraction, and facilitates the formation of an optical waveguide of any pattern such as a bend.

In particular, when the material of the substrate is LiNbO$_3$, the electrode configuration comprising lumped-parameter type electrodes (12a) having L-shaped sections makes it possible for the Γ value to be made sufficiently large, whereby it is possible to make the efficiency high and make the driving voltage low.

Since the ridge-form optical modulator shown in FIG. 15 has the optical waveguide (23) having a rectangular section, it can solve the various problems experienced with the above-described optical modulators shown in FIGS. 11 to 14. However, since $n_m$ is as large as >4.2 and $Z_o$>50Ω, there are disadvantages in that it is impossible to completely match the phase velocity of the optical wave with that of the modulating wave and the matching of impedance is difficult.

SUMMARY OF THE INVENTION

It is an object of the present invention to provide a traveling-wave type wide band optical modulator which can solve the above-described problems of conventional optical modulators and which exhibits a wide band, a low driving voltage, and a high efficiency of modulation and can obtain complete matching of the phase velocity of an optical wave with that of a modulating wave.

In an optical modulator comprising a guide structure made of a substance having electro-optic effects, as a result of investigations with respect to various configurations of optical modulators which have been conducted with a view to lowering driving voltages and widening bands by making the matching of the phase velocity of an optical wave with that of a modulating wave complete, it has been found that the characteristic of a super-wide band which is theoretically infinite can be obtained by laminating on the ridge-type optical waveguide (23) shown in FIG. 15 a substance having a refractive index lower than that of the optical waveguide and providing two traveling-wave electrodes opposite to each other on the parallel end surfaces in the traveling direction of light in place of the conventional lumped-parameter type electrodes (12a). It has also been found that such an optical modulator having excellent characteristics of a quality not exhibited by conventional optical modulators can be achieved since it is possible to attain high efficiency by increasing the field correction factor, to make the driving voltage extremely small, and to obtain the matching with a feeding system of a 50Ω impedance, and that such an optical modulator can be used for high-speed large capacity light transmission or in a super-wide band optical exchanger, these findings having led to the achievement of the present invention.

In addition, it was confirmed that when the laminate comprising a substance having a refractive index lower than that of the optical waveguide and provided on the ridge-type optical waveguide is replaced by a space, similar effects can also be obtained.

In other words, the present invention relates to a wide band optical modulator characterized by providing two traveling-wave electrodes which are opposite to each other in the traveling direction of light on the parallel side surfaces of a laminate which is provided on an optical waveguide made of a substance having electro-optic effects and provided on a substrate. The laminate comprises a substance having a refractive index lower than that of the optical waveguide. The present invention also relates to a wide band optical modulator characterized in that a gap is formed on an optical waveguide made of a substance having electro-optic effects and provided on a substrate. Two traveling-wave electrodes are provided opposite to each other in parallel with the traveling direction of light and are supported by a substance having a refractive index lower than that of the optical waveguide in contact with the outer surfaces of the electrodes.

BRIEF DESCRIPTION OF THE DRAWINGS

FIGS. 2(a) to 2(f) are explanatory views illustrating the production processes of the wide band optical modulator shown in FIG. 1, and FIG. 2(g) is an explanatory view illustrating the dimensions of the material after being subjected to ion etching:

DESCRIPTION OF THE PREFERRED EMBODIMENTS

Figure 1A:
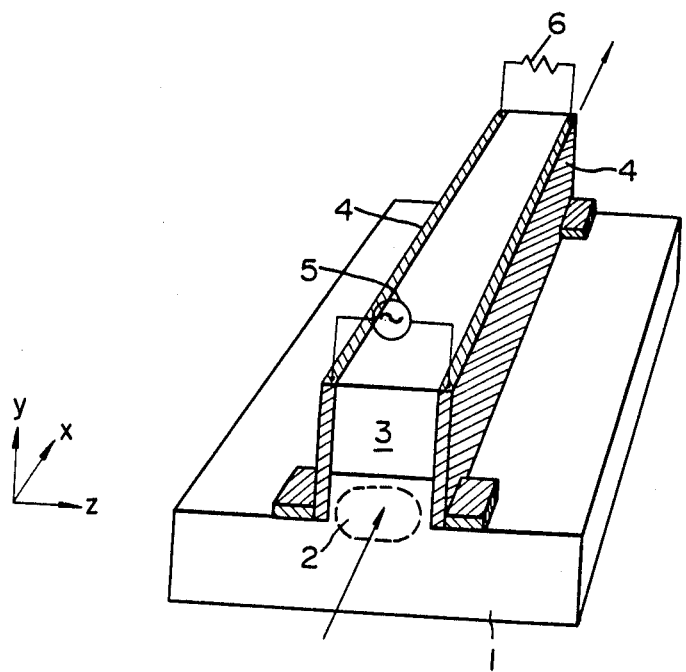
FIGS. 1(a), 1(b) are a perspective view and an explanatory sectional view, respectively, of a wide band optical modulator of the present invention.

As described above, an optical modulator in accordance with the present invention is characterized by comprising a laminate which is provided on an optical waveguide and comprises a substance having a refractive index lower than the latter, and two traveling-wave electrodes which are provided opposite and parallel to each other on both sides of the laminate in the traveling direction of light; or by comprising a gap provided on the optical waveguide in place of the laminate which comprises the substance having a refractive index lower than that of the optical waveguide. In such an optical modulator, since the phase velocity of an optical wave can be completely matched with that of a modulating wave, as compared with conventional traveling-wave type and ridge-type optical modulators, it displays the characteristics of a super-wide band.

This is brought about by the two traveling-wave electrodes which hold the optical waveguide and the laminate thereon or the gap, and the greater part of the electric power of a modulation field is applied to the laminate comprising a substance having a lower refractive index or the gap, thereby producing the effect of reducing the equivalent refractive index $n_m$. In addition, since a large modulation field is applied to the optical waveguide due to the edge effects of the electrodes, a large $\Gamma$ value can be obtained in spite of the use of fractions of the electric power. Such effects can reduce the driving voltage and high efficiency can thus be obtained.

In the present invention, piezo-electric porcelain materials and semiconductor materials such as GaAs, InP, or ZnS can be used as a substance having electro-optic effects which comprises the optical waveguide, but it is preferable to use materials having larger electro-optic constants which are capable of high-frequency modulation, particularly $LiNbO_3$ or $LiTaO_3$.

When such a material is also used in the substrate, Ti-diffused $LiNbO_3$, proton-exchange $LiNbO_3$, or $Li_2O$-externally diffused $LiNbO_3$ is preferable, as in the above embodiments.

In addition, if the refractive index of the material of which the substrate is made in the portions other than the optical waveguide is slightly larger than that of the optical waveguide portion, that material need not be limited to the above-described substances having electro-optic effects.

The optical waveguide provided on the substrate can therefore be suitably selected in accordance with the use of the optical modulator and the configuration of the optical waveguide, for example, it may be integral with the substrate, as $LiNbO_3$ and Ti-diffused $LiNbO_3$ in the embodiments described herein; or it may have a laminate structure comprising a material which is the same as or different from that of the substrate.

In the present invention, any materials exhibiting a refractive index smaller than that of the material of the optical waveguide and a small dielectric loss at a high frequency, for example, organic films such as polyurethane or fluorine plastics and glass, can be used as the substance laminated on the optical waveguide between the two traveling-wave electrodes, but $SiO_2$ is preferable.

In addition, any materials exhibiting a refractive index smaller than that of the material of the optical waveguide and a small dielectric loss at a high frequency can also be used as the substance which is in contact with the outer surfaces of the two opposite traveling-wave electrodes forming the gap so as to hold them in place, but $SiO_2$ is preferable here too.

The substance laminated on the optical waveguide between the two traveling-wave electrodes preferably has a rectangular or trapezoidal section on the surface that is perpendicular to the traveling direction of light, particularly a rectangular section having a contact width which is the same as that of the optical waveguide and which is a short side.

Similarly, when the gap is formed between the two traveling-wave electrodes, the gap preferably has a rectangular or trapezoidal section.

Known materials and various shapes can be used for the two traveling-wave electrodes opposite to each other which hold therebetween the substance having a refractive index smaller than that of the optical waveguide or hold the gap, but the shapes of the electrodes are preferably symmetrical from the viewpoint of electrical impedance. In addition, it is particularly preferable that the two traveling-wave electrodes have a plate-like form and are provided in parallel with each other.

The configurations of the optical modulators in accordance with the present invention are described in detail below on the basis of the accompanying drawings.

Figure 1B:
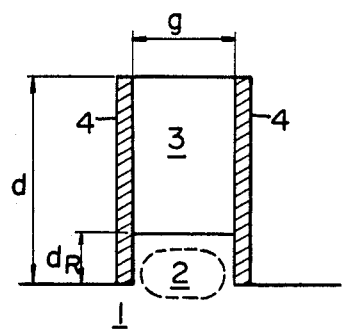

An optical modulator of the present invention as shown in FIG. 1 comprises an optical waveguide (2) which is provided on a substrate (1) comprising a $LiNbO_3$, y-plate and comprises a substance (Ti-diffused $LiNbO_3$) having electro-optic effects; a laminate which is provided on the optical waveguide (2) and comprises a substance, i.e. a $SiO_2$ layer (3), having a refractive index smaller than that of the optical waveguide; two traveling-wave electrodes (4) which are provided on each side of the laminate opposite to each other on the side surfaces thereof and in parallel with the traveling direction of light and which comprise, for example, Al (or Au, but in this embodiment, Al); a power source for modulation (5) which is connected to each end of the traveling-wave electrodes; and a resistance (6) which is provided at each of the other ends of the traveling-wave electrodes (4).

A production method will now be explained with reference to FIG. 2.

(a) Ti is evaporated on the $LiNbO_3$ substrate (1) and then subjected to thermal diffusion.

(b) The $SiO_3$ layer (3) is then formed by sputtering.

(c) A Ti-mask is formed by sputtering on the $SiO_2$ layer (3) so that a pattern is formed.

(d) The $SiO_2$ layer (3) and the Ti-diffused $LiNbO_3$ layer are then etched to a desired depth by ECR-type reactive ion etching so that a convex laminate comprising the Ti-diffused $LiNbO_3$ layer which served as the optical waveguide and the $SiO_2$ layer (3) which is laminated thereon is formed on the substrate (1).

(e) $Al_2O_3$ is evaporated on the whole of the substrate (1) containing the laminate portion in order to prevent the attenuation of light.

(f) The Al electrodes (4) are formed by sputtering accumulation on the side surfaces of the laminate in the lengthwise direction so that a pattern is formed. Namely, the two Al electrodes (4) are provided opposite to each other on either side of the laminate which comprises the $SiO_3$ layer (3) having a refractive index smaller than that of the optical waveguide (2) comprising the Ti-diffused $LiNbO_3$ layer.

In the above-described optical modulator, since a LiNbO$_3$ crystal y-plate can be used as the substrate (1), when the traveling-wave electrodes (4) of parallel plates are formed in the optical waveguide (2) and a electrical field is applied thereto, the maximum electro-optic constant r$_{33}$ can be used and the $\Gamma$ value becomes large, resulting in an extremely small V$_{90}$ value obtained from the equation (5).

In the optical modulator of the present invention shown in FIG. 1, when SiO$_2$ (dielectric constant $\epsilon_y=3.6$) is used as the dielectric which is laminated on the optical waveguide, assuming that the width of the optical waveguide is g, the height of the optical waveguide is d$_R$, and the height of the optical waveguide and the SiO$_2$ layer (3) is d, the electrostatic capacities C, C$_o$ relative to d/g, d$_R$/g, respectively, were determined by a succesive over-relaxation method, and the frequency bandwidth f$_m$·1 and the characteristic impedance Z$_o$ were obtained from the equations (2), (3), and (6). The results are shown in FIG. 3.

In this case, the dielectric constants used for LiNbO$_3$ were $\epsilon_r{}^y=\epsilon_1=43$, $\epsilon_r{}^z=\epsilon_3=28$.

Figure 3:
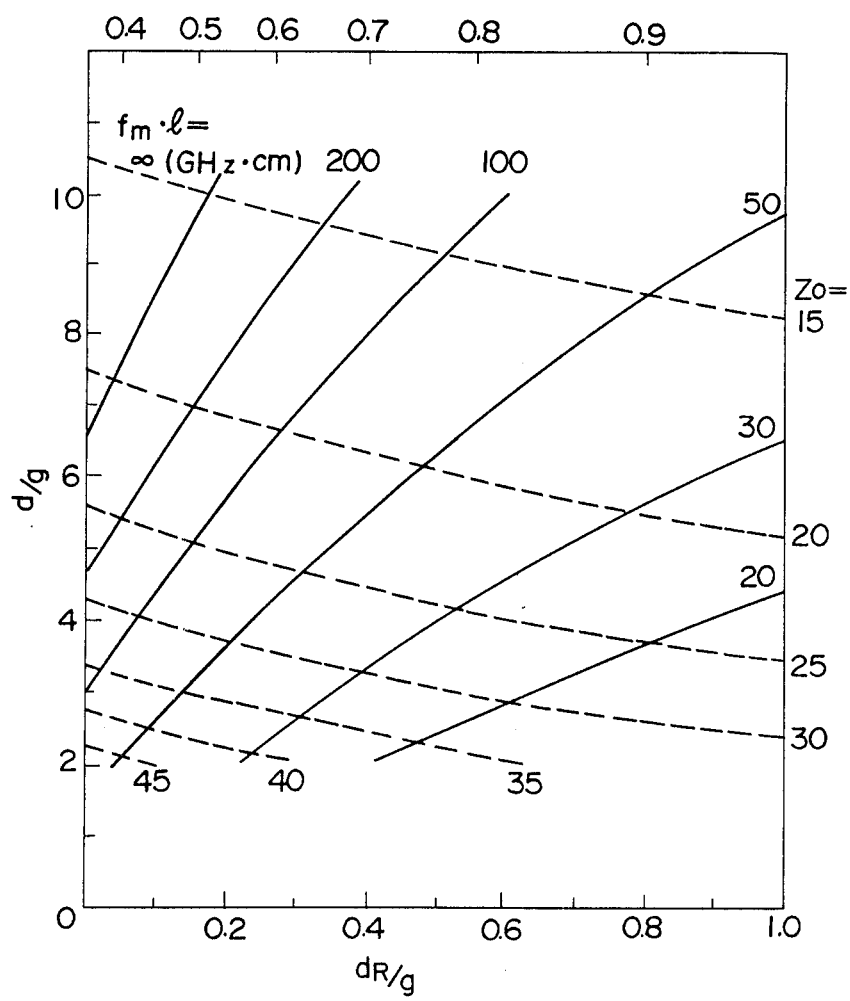
FIG. 3 is a graph of the relationship between $d_R/g$, $d/g$, $Z_o$ and Γ which shows the characteristics of the wide band optical modulator shown in FIG. 1.

It can be seen from FIG. 3 that F$_m$·1=$\infty$ under the condition of d/g>7, namely, the phase velocity of the optical wave is completely matched with that of the modulating wave. At the same time, Z$_o$ becomes about 22Ω or less. If both d$_R$/g and d/g are increased while the conditions of the matching of the phase velocities are maintained, the $\Gamma$ value is increased.

For example, if $$d_R/g=0.2, d/g=10,$$

$\Gamma \approx 0.5$ and from the equation (5), $$V_\pi \cdot l = 1.54\ Vcm,\ Z_o = 15\Omega, f_m \cdot l = \infty$$

In this case, the electrical power required for modulation is determined from the equation (4) to $$P \cdot l^2 = 80\ mW \cdot cm^2$$

wherein g=4μm, $\lambda_o$=633 nm, $\gamma_{33}$=30.8×10$^{-12}$m/V.

Figure 6A:
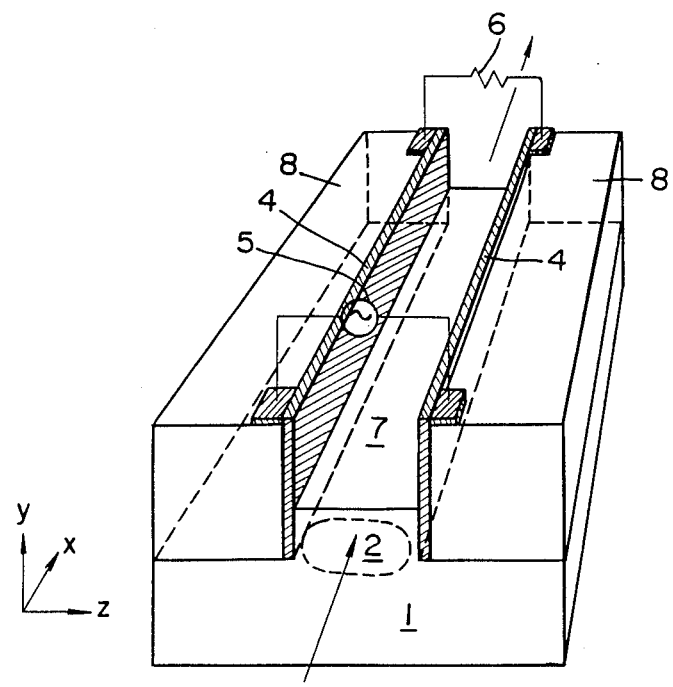
FIGS. 6(a) and 6(b) are a perspective view and an explanatory sectional view of another wide band optical modulator in accordance with the present invention.
Figure 6B:
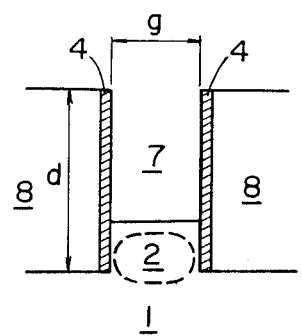

Another optical modulator of the present invention shown in FIG. 6 comprises an optical waveguide (2) which is provided on a substrate comprising a LiNbO$_3$ y-plate and which comprises a substance (Ti-diffused LiNbO$_3$) having electro-optical effects; a gap (7) which is formed on the optical waveguide (2); two traveling-wave type electrodes which comprises Al, and is provided opposite to each other and the outer surfaces of which are each supported by electrode-supporting members (8) provided on the substrate (1) and comprising a laminated SiO$_2$ layer; a power source for modulation (5) which is connected to each end of the traveling-wave type electrodes; and a resistance (6) which is provided at each of the other ends of the traveling-wave type electrodes (4).

Figure 7:
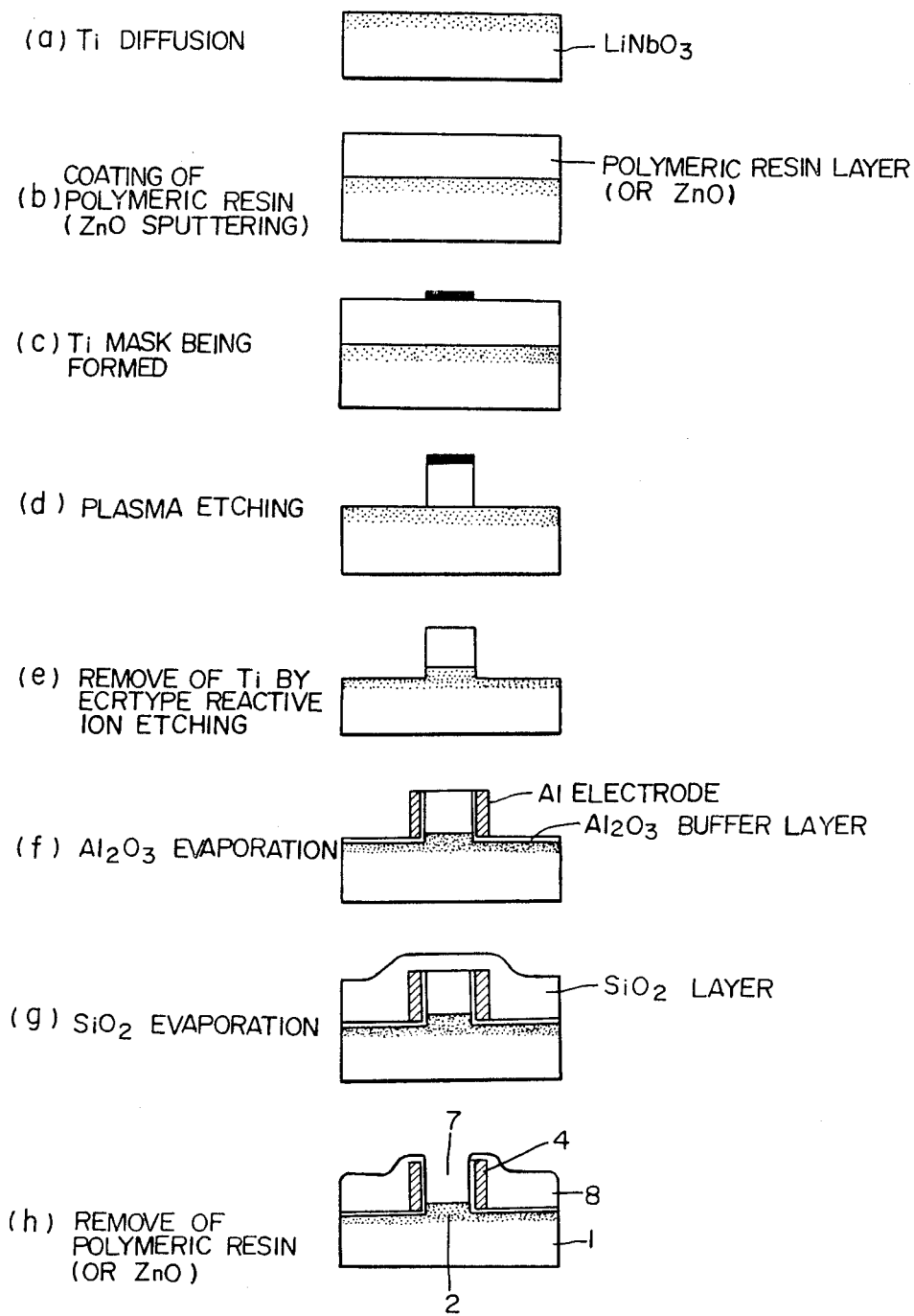
FIGS. 7(a) to 7(h) are explanatory views illustrating the production processes of the wide band optical modulator shown in FIG. 6.

A production method will now be explained with reference to FIG. 7.

(a) Ti is evaporated on the LiNbO$_3$ substrate (1) and then subjected to thermal diffusion.

(b) Then, the coating or sputtering of, for example, a polymeric resin (AZ-based, PMMA-based, etc) or ZnO is preformed.

(c) A Ti-mask is then formed by sputtering on the polymeric resin or ZnO layer so that a pattern is formed.

(d) The polymeric resin or ZnO layer is then etched to a desired depth by plasma etching.

(e) The Ti-diffused LiNbO$_3$ layer is etched to a desired depth by ECR-type reactive ion etching so that a laminated convex comprising a Ti-diffused LiNbO$_3$ layer which serves as the optical waveguide and the polymeric resin or ZnO layer which is laminted thereon is formed on the substrate (1).

(f) An Al$_2$O$_3$ buffer layer is formed by evaporation on the entire surface of the substrate (1) containing the laminated portion in order to prevent the attenuation of light and the Al electrodes (4) (traveling-wave type electrodes) are then formed by sputtering accumulation on the side surfaces of the laminate in the lengthwise direction so that a pattern is formed.

(g) A SiO$_2$ layer of a desired thickness is formed on the side surfaces of the laminate in the lengthwise direction thereof by evaporating SiO$_2$ twice from the two points corresponding to the upper right and upper left of the drawing.

(h) The polymeric resin or ZnO layer is removed by dissolving it in a solvent (acetone or a J 100 remover for the polymeric resin layer, and a HCl-based etchant for the ZnO layer).

By the above-described processes, it is possible to obtain a photomodulator comprising the optical waveguide (2) which comprises the Ti-diffused LiNbO$_3$ layer, the gap (7) which is formed on the optical waveguide and has a refractive index smaller than the latter, the two Al electrodes (4) which are disposed opposite to each other and between which the gap (7) is provided, and the electrode supporting members (8) which support the outer surfaces of the electrodes (4) and comprise the SiO$_2$ layers laminated on the substrate (1).

In the above-described optical modulator, since a y-plate of a LiNbO$_3$ crystal can be used as the substrate (1), when the traveling-wave electrodes (4) of parallel plates are formed in the optical waveguide (2) and a electrical field is applied thereto, the maximum electro-optic constant r$_{33}$ can be used and the $\Gamma$ value becomes large, resulting in an extremely small V$_\pi$ value obtained from the equation (5).

When the gap was formed on the optical waveguide and SiO$_2$ was used in the electrode supporting members, in a similar manner to that of the optical modulator shown in FIG. 1, fm, Z$_o$, $\Gamma$ were calculated from the equations (2) to (6). The relationship between the obtained results and d/g, d$_R$/g are shown in FIG. 8.

Since the configuration in which the gap is formed enables the control of n$_m$ within the range of 1 to 5, a complete matching with n$_o$=2.20 can be obtained. Namely, the bandwidth theoretically becomes infinite.

In addition, in the optical modulator configured as described above, since Z$_o$<55Ω can be realized at $f_m \cdot l = \infty$, the phase velocity matching and impedance matching of Z$_o$=50Ω can be simultaneously achieved.

Figure 8:
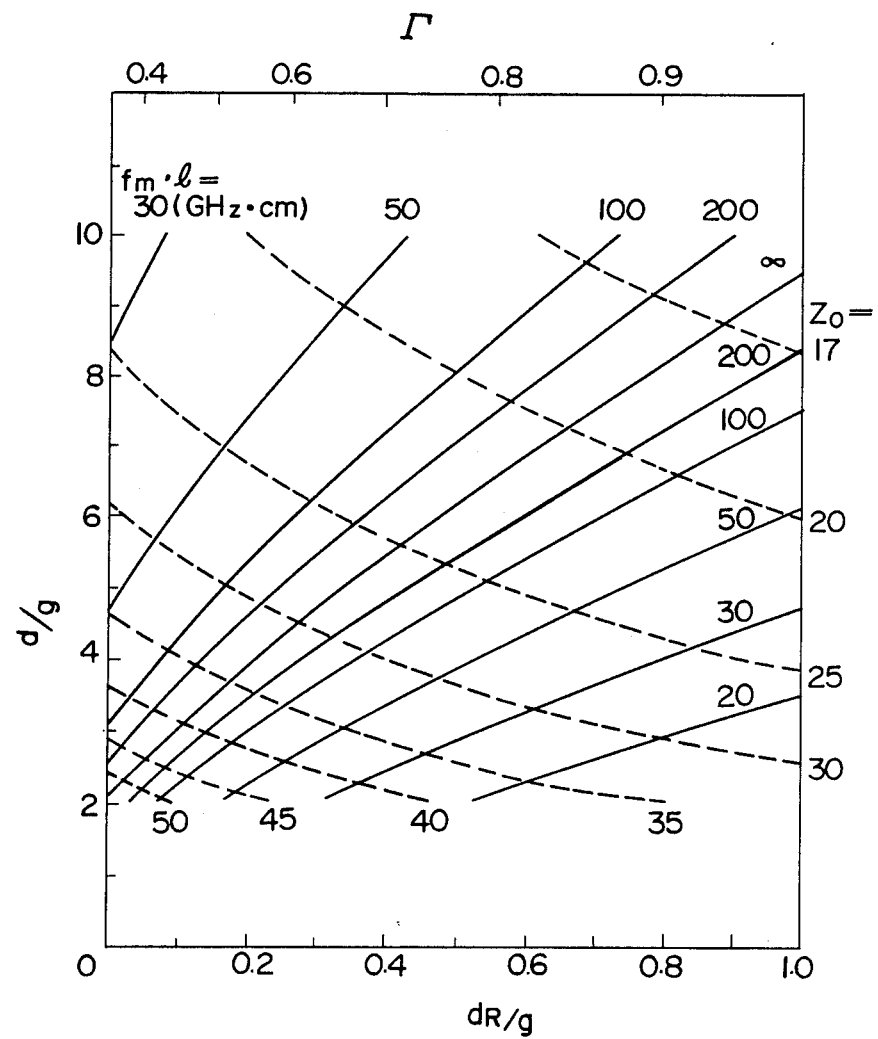
FIG. 8 is a graph of the relationship between $d_R/g$, $d/g$, $Z_o$ and Γ which show the characteristics of the wide band optical modulator shown in FIG. 6.

For example, if g=4 μm so that the optical waveguide assumes a single mode at $\lambda_o$=633 nm, d$_{Rg}$=0.02 and d/g=2.35 are obtained from FIG. 8. Namely, at d$_R$≈0.1 μm and d=9.4 μm, $$f_m \cdot l = \infty\ GHz \cdot cm,\ Z_o = 50\Omega.$$

In this case, $\Gamma$=0.38, thus $$V_\pi \cdot l = 2.2 V \cdot cm\ Pl^2 = 60 mW \cdot cm^2.$$

In addition, as seen from FIG. 8, if the optical modulator is designed at the characteristic impedance of $Z_o=35\Omega$, efficiency is slightly deteriorated to 97% relative to a 50$\Omega$ feeding system, as compared with the case of $Z_o=50\Omega$, but at $g=4$ $\mu$m, $d_R/g=0.2$ and $d/g=4.0$, namely, the dimensions are $d_R=0.8$ $\mu$m and $d=16$ $\mu$m, $f_mL = \infty$ $CHz.cm$.

It is therefore found that a high-efficiency element with $V.l=1.54$ $Vcm$ and $Pl^2=35$ mW cm$^2$ at $\Gamma=0.53$ can be easily obtained.

Figure 9:
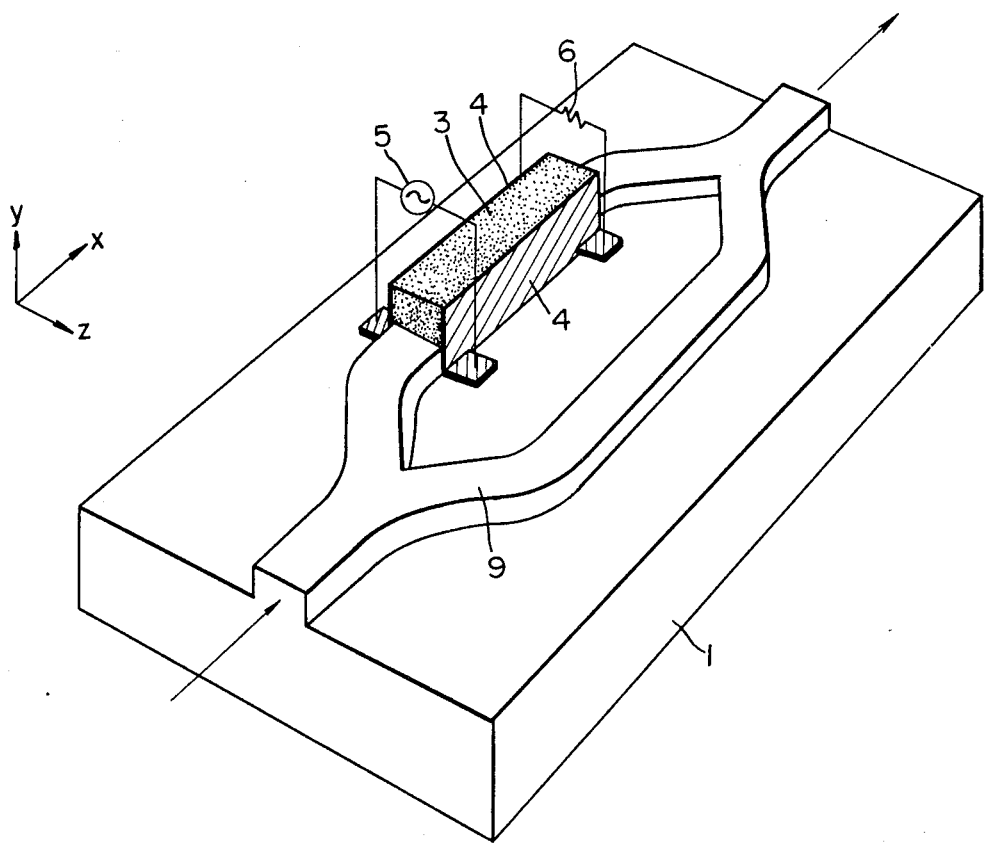
FIGS. 9 and 10 are explanatory perspective views of other wide band optical modulators showing other examples of application of the present invention.
Figure 10:
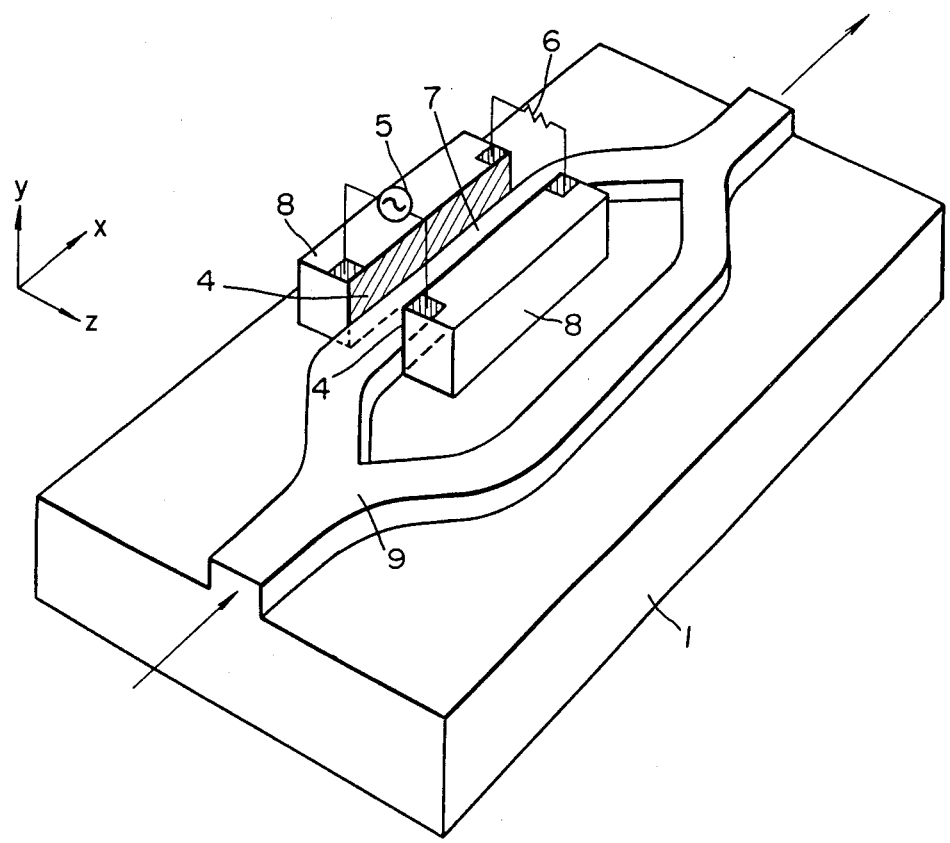
Figure 11:
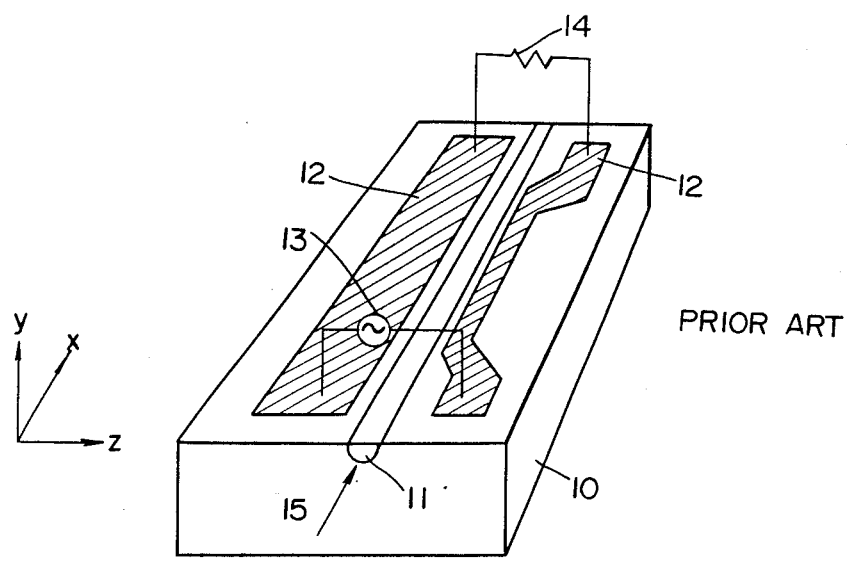
FIGS. 11 and 12 are explanatory perspective views of conventional optical modulators, FIG. 11 illustrating a optical modulator having asymmetrical electrodes and FIG. 12 illustrating an optical modulator having traveling-wave electrodes in which the phases are periodically inverted.
Figure 12:
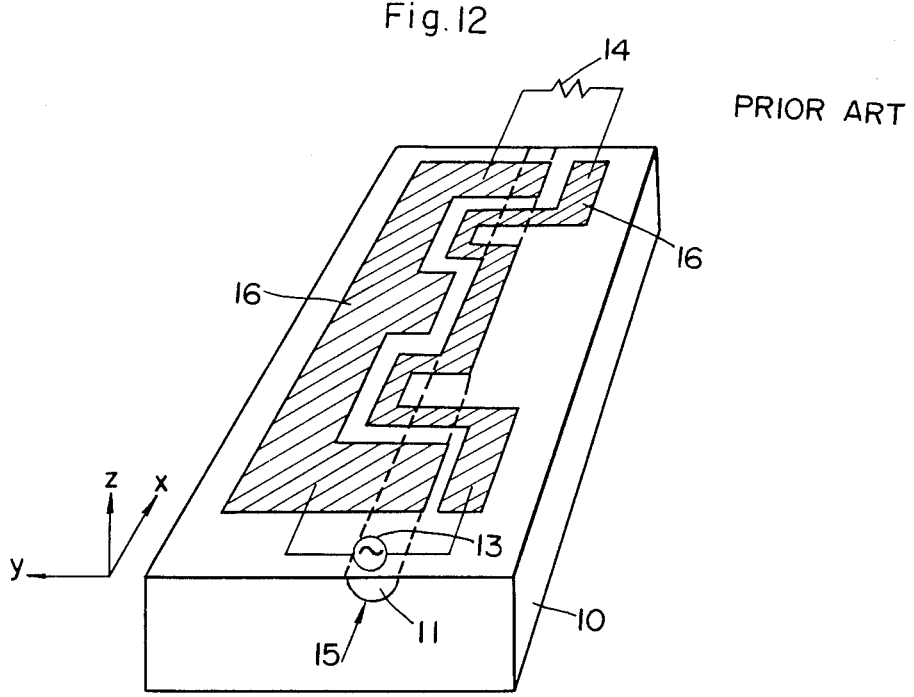
Figure 13A:
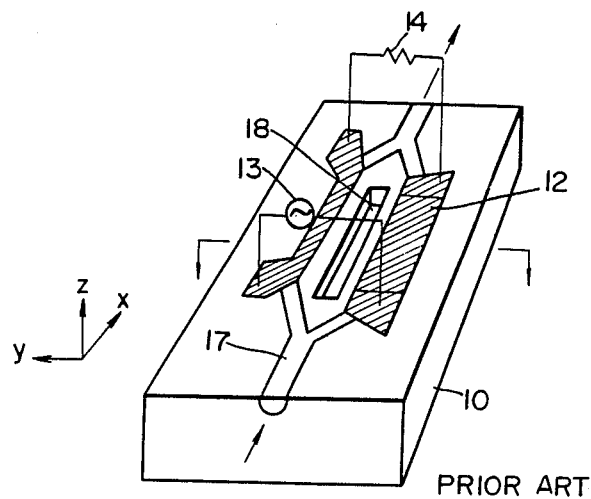
FIGS. 13(a), 14(a) and 13(b), 14(b) are explanatory perspective views and explanatory views of conventional optical modulators, respectively.
Figure 13B:
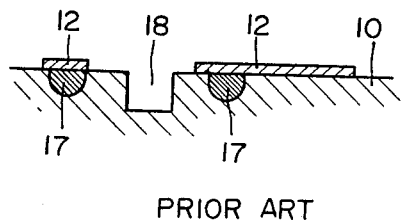
Figure 14A:
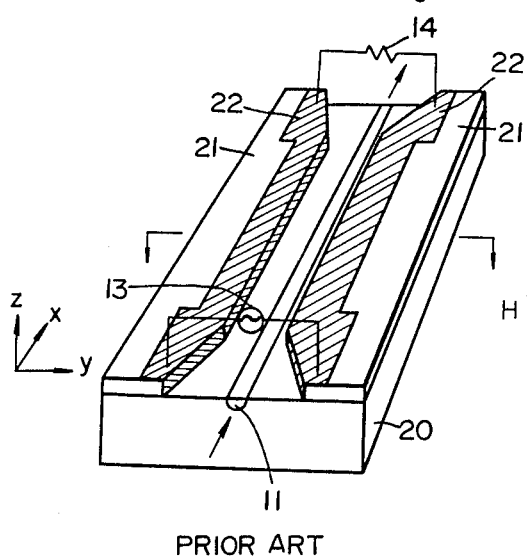
Figure 14B:
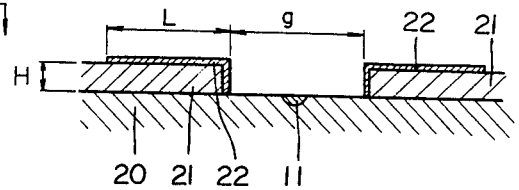
Figure 15:
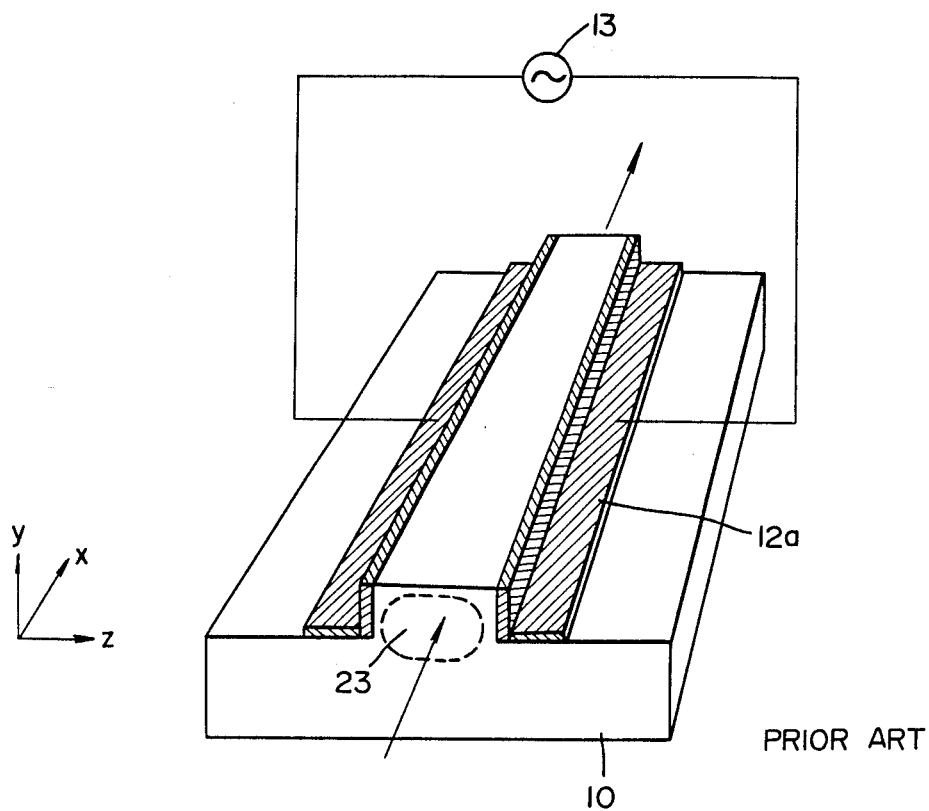
FIG. 15 is a explanatory perspective view of a conventional optical modulator of the ridge type.

FIGS. 9 and 10 are examples of the applications of the optical modulators of the present invention to light-strength modulators.

An optical waveguide (9) provided on a substrate (1) branches into two optical waveguides in the central part and each of the optical modulators of the present invention is formed on one of the optical waveguides. FIG. 9 is an example in which the optical modulator shown in FIG. 1 is used and FIG. 10 is an example in which the optical modulator shown in FIG. 6 is used.

Incident light is divided into two equivalent parts by a 3 dB coupler such as a Y-branch and each part is individually transmitted in each of the branched optical waveguides. When no modulation voltage is applied, the two parts of light join at a Y-branch on the output side while having the equivalent phase and are then output at the output end. In the other hand, when a modulation voltage is applied to the outgoing ends of the two phase change portions (two branched optical waveguide portions) so as to make a phase difference $\pi$, no ray of light is output at the outgoing end of the Y-branch. In other words, the above-described configurations enable phase changes to be converted into a strength changes.

Low-loss elements such as signal directional coupler, gate coupler (distribution coupler comprising three guides), and an antenna coupling-type Y-branch, other than the Y-branch, can be used as the above-described 3 dB coupler.

As seen from the above description, if each of the optical modulators of the present invention is used in the phase change portion, a strength modulator with a modulation bandwidth of $f_m=\infty$ GHz can be easily realized. In addition, since there is no theoretical limit on the length of each electrode in each of the optical modulators shown in FIGS. 9 and 10 under the condition of $f_m=\infty$ GHz, if l is increased, it can be seen from the equation (5) that $V_\pi$ can be greatly reduced.

As described above, the wide band optical modulators of the present invention have the characteristic of a super-wide band which is theoretically infinite and exhibit a very small driving voltage and an excellent capability to achieve the matching with a 50$\Omega$ feeding system which has been not previously attained. Therefore, the optical modulators have an advantage in that they can be used as a optical modulator for high-speed, large-capacity light transmission or in a super-wide band optical exchanger.

EMBODIMENT

Embodiment 1

In order to produce the optical modulator shown in FIG. 1, the dimensions of each electrode and the optical waveguide were set to the following values:

Electrode: height $d=6$ $\mu$m, width $g=3$ $\mu$m, length $l=4.8$ mm

Optical waveguide: height $d_R=0.8$ $\mu$m

In this case, assuming that $\lambda_o=633$ nm, the characteristics obtained from the equations (2) to (6) and FIG. 3 are $V_\pi=2.4$ V, $\Gamma=0.5$, $Z_o=40\Omega$, $fm=62.5$ GHz, $P=72$ mW.

The optical modulator of the present invention was produced in accordance with the production method shown in FIG. 2.

Ti was evaporated to a thickness of 300 Å on LiNbO$_3$ and then subjected to thermal diffusion at 1040° C. for 5 hours in the air. SiO$_2$ was then accumulated to a thickness of 5 $\mu$m by sputtering and a Ti mask was formed by sputtering so that a pattern was formed. The SiO$_2$ and Ti-diffused LiNbO$_3$ layers were then etched to a desired depth by ECR-type reactive ion etching. An Al$_2$O$_3$ film having a thickness of 0.2 $\mu$m was formed by evaporation on the entire surface of the substrate in order to prevent the attenuation of light and Al electrodes having a thickness of 1 $\mu$m were formed by sputtering accumulation so that a pattern of a desired shape was formed.

The dimensions of the optical modulator obtained were as follows:

Electrode: height, $d=5.2$ $\mu$m, width $g=2$ $\mu$m, Length $l=4.6$ mm

Optical waveguide: height $d_R=0.8$ $\mu$m

Figure 4:
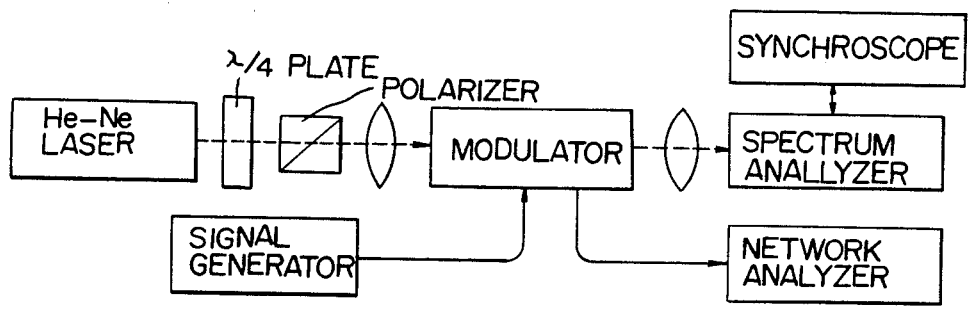
FIG. 4 is a block diagram of a measuring apparatus for measuring the characteristics of super-wide band light modulation.

Measurements were made by the method shown in FIG. 4, in which the outgoing light from the optical modulator was detected by using a Fabry-Perot resonator type spectrum analyzer and the side band (changed in spectrum) produced by the application of microwave electric power was observed.

Figure 5:
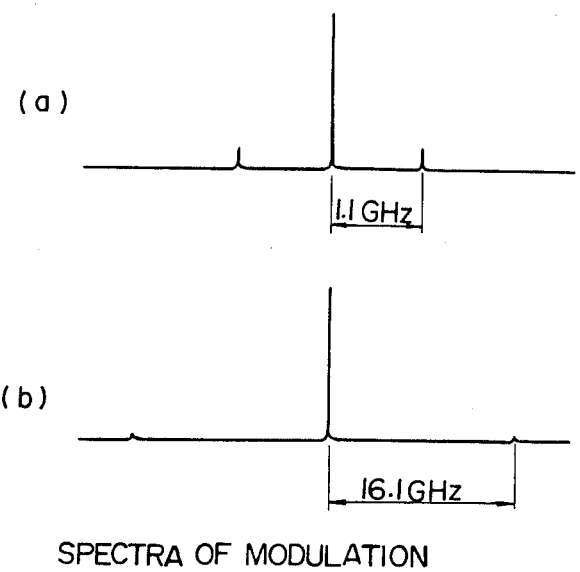
FIG. 5 is a drawing of the spectra showing the characteristics of modulation achieved by the wide band optical modulator shown in FIG. 1.

Examples of the measurement are shown in FIG. 5, (a) and (b) showing examples of modulation at 1.1 GHz and 16.1 GHz, respectively. Since the electrodes were thin, the microwave loss was about 10 dB at 10 GHz or more. Although no spectrum could be measured at 20 GHz or more due to the limit on the power source used, it could be estimated from the results obtained from separate measurements of impedance that the element could be operated until about 50 GHz.

In addition, the measured value of $V_\pi$ was 1.7 V which was smaller than a theoretical value, and it was confirmed that the optical modulator having excellent characteristics which have been not previously attained could be obtained.

We claim:

1. A wide band optical modulator comprising an optical waveguide formed on a substrate of a substance having electro-optic properties, a laminate formed on the upper surface of said optical waveguide and having a refractive index smaller than that of said optical waveguide, and two traveling-waveguide electrodes disposed opposite to each other on each side surface of said optical waveguide and said laminate to retain both said optical waveguide and said laminate therebetween, thereby forming an electric field between said two traveling-waveguide electrodes, the electric field being perpendicular to the traveling direction of light and the direction of disposition of said laminate on said optical waveguide.

2. A wide band optical modulator according to claim 1, wherein said laminate disposed on said optical waveguide between said two travelling-waveguide electrodes is SiO$_2$.

3. A wide band optical modulator according to claim 1, wherein the material of said substrate is LiNbO$_3$ and said optical waveguide is Ti-diffused LiNbO$_3$.

4. A wide band optical modulator according to claim 1, wherein the sectional shape of said laminate which is provided between said two travelling-wave electrodes on said optical waveguide is at least one of a rectangle or trapezoid on the surface perpendicular to the travelling direction of light.

5. A wide band optical modulator according to claim 1, wherein the opposite surfaces of said two traveling-wave electrodes have symmetrical shapes.

6. A wide band optical modulator according to claim 1, wherein a sectional area S$_1$ perpendicular to the traveling direction of light on the optical waveguide provided between two traveling waveguide electrodes and a sectional area S$_2$ perpendicular to the traveling direction of light of the laminate have a relationship of S$_1$<S$_2$.

7. A wide band optical modulator according to claim 1, wherein a ratio of a width (g) of the optical waveguide provided between the two traveling waveguide electrodes to a height (d) of each of the traveling waveguide electrodes is d/g>2.

8. A wide band optical modulator comprising an optical waveguide formed on a substrate and composed of a substance having electro-optic properties, a gap formed on the upper surface of said optical waveguide, and two travelling-waveguide electrodes disposed opposite each other on each side surface of said optical waveguide and said gap to retain both said optical waveguide and said gap therebetween, thereby forming an electric field between said two traveling-waveguide electrodes, said electric field being perpendicular to the traveling direction of light and the direction of disposition of said gap on said optical waveguide; and electrode supporting members each having a refractive index smaller than that of said optical waveguide and supporting each of said travelling-waveguide electrodes.

9. A wide band optical modulator according to claim 8, wherein said electrode supporting members comprise SiO$_2$.

10. A wide band optical modulator according to claim 8, wherein the sectional shape of said gap formed between said opposite two travelling-wave electrodes is at least one of a rectangle or trapezoid on the surface perpendicular to the travelling direction of light.

11. A wide band optical modulator according to claim 5, wherein said two traveling-wave electrodes are plates and are provided in parallel with each other.

12. A wide band optical modulator according to claim 5, wherein said two traveling-wave electrodes each comprise Al.

13. A wide band optical modulator according to claim 8, wherein a sectional area S$_1$ perpendicular to the traveling direction of light of the optical waveguide provided between two traveling waveguide electrodes and a sectional area S$_2$ perpendicular to the traveliing direction of light of the gap have a relationship of S$_1$<S$_2$.

14. A wide band optical modulator according to claim 8, wherein a ratio of width (g) of the optical waveguide provided between the two traveling waveguide electrodes to a height (d) of each of the traveling waveguide electrodes is d/g>2.

15. A wide band optical modulator comprising a ridge-type optical waveguide formed on a substrate and composed of a substance having electro-optic properties; a laminate formed on the upper surface of said ridge-type optical waveguide and having a refractive index smaller than that of said ridge-type optical waveguide; and two traveling-waveguide electrodes disposed opposite to each other on each side of said ridge-type optical waveguide and said laminate to retain both said ridge-type optical waveguide and said laminate therebetween, thereby forming an electric field between said two traveling-waveguide electrodes, said electric field being perpendicular to the traveling direction of light and the direction of disposition of said laminate on said optical waveguide.

16. A wide band optical modulator, comprising a plurality of branched ridge-type optical waveguide formed on a substrate and composed of a substance having electro-optic properties; a laminate formed on the upper surface of at least one of said ridge-type optical waveguide and having a refractive index smaller than that of said ridge-type optical waveguide; and two traveling-waveguide electrodes disposed opposite to each other on each side of said ridge-type optical waveguide and said laminate to retain both said ridge-type optical waveguide and said laminate therebetween, thereby forming an electric field between said two traveling-waveguide electrodes, said electric field being perpendicular to the traveling direction of light and the direction of disposition of said laminate on said optical waveguide.

17. A wide band optical modulator, comprising a ridge-type optical waveguide formed on a substrate and composed of a substance having electro-optic properties; a gap formed on the upper surface of said ridge-type optical waveguide and having a refractive index smaller than that of said ridge-type optical waveguide; and two traveling-waveguide electrodes disposed opposite to each other on each side of said ridge-type optical waveguide and said gap to retain both said ridge-type optical waveguide and said gap therebetween, thereby forming an electric field between said two traveling-waveguide electrodes, said electric field being perpendicular to the traveling direction of light and the direction of disposition of said gap on said optical waveguide.

18. A wide band optical modulator comprising a plurality of ridge-type optical waveguides formed on a substrate and composed of a substance having electro-optic properties; a gap formed on the upper surface of at least one of said ridge-type optical waveguide and having a refractive index smaller than that of said ridge-type optical waveguide ; and two traveling-waveguide electrodes disposed opposite to each other one each side of said ridge-type optical waveguide and said gap to retain both said ridge-type optical waveguide and said gap therebetween, thereby forming an electric field between said two traveling-waveguide electrodes, said electric field being perpendicular to the traveling direction of light and the direction of disposition of said gap on said optical waveguide.

19. A wide band optical modulator according to claim 8, wherein the opposite surfaces of said two traveling-wave electrodes have symmetrical shapes.

20. A wide band optical modulator according to claim 8, wherein the material of said substrate is LiNbO$_3$ and said optical waveguide is Ti-diffused LiNbO$_3$.

* * * * *